United States Patent
He et al.

(10) Patent No.: US 12,004,219 B2
(45) Date of Patent: Jun. 4, 2024

(54) RANDOM ACCESS METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Chuanfeng He, Guangdong (CN); Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 637 days.

(21) Appl. No.: 17/235,671

(22) Filed: Apr. 20, 2021

(65) Prior Publication Data
US 2021/0243813 A1    Aug. 5, 2021

Related U.S. Application Data (63) Continuation of application No. PCT/CN2018/112268, filed on Oct. 27, 2018.

(51) Int. Cl.
*H04W 74/0833* (2024.01)
*H04W 52/14* (2009.01)

(52) U.S. Cl.
CPC ..... *H04W 74/0833* (2013.01); *H04W 52/146* (2013.01)

(58) Field of Classification Search
CPC ........... H04W 74/0833; H04W 52/146; H04W 52/16; H04W 52/50; H04W 74/004; H04W 74/006
See application file for complete search history.

(56) References Cited

U.S. PATENT DOCUMENTS

| | | |
|---|---|---|
| 2015/0078188 A1 | 3/2015 | Xu et al. |
| 2020/0178312 A1 | 6/2020 | Jiang |

(Continued)

FOREIGN PATENT DOCUMENTS

| | | |
|---|---|---|
| CN | 101674661 A | 3/2010 |
| CN | 102932892 A | 2/2013 |

(Continued)

OTHER PUBLICATIONS

Extended European Search Report for EP Application 18937920.9 dated Nov. 12, 2021. (10 pages).

(Continued)

*Primary Examiner* — Kyaw Z Soe
(74) *Attorney, Agent, or Firm* — Young Basile Hanlon & MacFarlane, P.C.

(57) ABSTRACT

The implementations of the present disclosure relate to a random access method, a terminal device and a network device. The method includes: a terminal device receiving indication information sent by a network device, wherein the indication information is used for indicating at least one random access preamble from among multiple random access preambles, and the multiple random access preambles correspond to a receiving window of a random access response; and the terminal device determining, according to the transmission power of a first random access preamble from among the at least one random access preamble, the power for sending a physical uplink shared channel (PUSCH).

20 Claims, 4 Drawing Sheets

(56) References Cited

U.S. PATENT DOCUMENTS

2022/0014997 A1* 1/2022 Zhou ................. H04W 36/30
2022/0256620 A1* 8/2022 Lu ................... H04W 72/044

FOREIGN PATENT DOCUMENTS

CN 103200663 A 7/2013
CN 108476480 A 8/2018

OTHER PUBLICATIONS

3GPP TSG-RAN WG1 Meeting #73Fukuoka, USA, R1-132673, Alcatel-Lucent, Alcatel-Lucent Shanghai Bell, Qualcomm, AT&T, Ericsson, STEricsson, Correction to PUSCH/PUCCH transmit power after PRACH power ramping, May 20-24, 2013. (14 pages).
3GPP TSG-RAN WG1#NR3, Nagoya, Japan, R1-1716138, Nokia, Nokia Shanghai Bell, Remaining details on PRACH procedure, Sep. 18-21, 2017. (13 pages).
Sesia et al., "Random Access Pierre Bertrand and Jing Jiang", John Wiley & Sons, Incorporated, 2011. (17 pages).
3GPP TSG-RAN WG2 Meeting #99; Berlin, Germany, Aug. 21-25, 2017; R2-1709081.
International Search Report with English Translation for PCT/CN2018/112268 dated Jul. 29, 2019.
European Examination, Communication Pursuant to Article 94(3) EPC for EP Application 18937920.9 dated Jul. 26, 2023. (4 pages).

* cited by examiner

A terminal device receives indication information sent by a network device, the indication information is used for indicating at least one random access Preamble in multiple random access Preambles, and the multiple random access Preambles correspond to a random access response receiving window — 410

The terminal device determines a power for sending a physical uplink shared channel (PUSCH) according to a transmission power of a first random access Preamble in the at least one Preamble — 420

A network device sends indication information to a terminal device, the indication information is used for indicating at least one random access Preamble in random access Preambles detected by the network device, the random access Preambles detected by the network device are at least part of multiple random access Preambles sent by the terminal device, the at least one random access Preamble includes a first random access Preamble, and the multiple random access Preambles correspond to a random access response receiving window — 510

RANDOM ACCESS METHOD, TERMINAL DEVICE AND NETWORK DEVICE

CROSS-REFERENCE TO RELATED APPLICATION(S)

The present application is a continuation application of International PCT Application No. PCT/CN2018/112268, filed on Oct. 27, 2018, the entire content of which is hereby incorporated by reference.

TECHNICAL FIELD

Implementations of the present disclosure relate to a field of communication, and more specifically, to a random access method, a terminal device and a network device.

BACKGROUND

Random access is a most basic function of a cellular system. In a New Radio (NR) system (or called 5G system or 5G network), a four-step random access procedure similar to that in Long Term Evolution (LTE) is adopted.

An NR system supports a transmission on an unlicensed spectrum. When a communication device communicates on an unlicensed spectrum, it is needed to be based on a principle of Listen Before Talk (LBT). That is to say, the communication device needs to listen to a channel before sending a signal on the unlicensed spectrum channel. Only when a result of the channel listening is that the channel is idle can the communication device send the signal. If a result of a channel listening performed by the communication device on the unlicensed spectrum is that the channel is busy, the signal cannot be sent. Therefore, messages in the random access procedure may only be sent when the communication device obtains an idle channel.

After sending a random access preamble (that is message1, MSG1), the terminal device needs to receive a Random Access Response (RAR, that is message 2, MSG2) in an RAR receiving window. If the RAR is not received, the terminal device sends the preamble again. Since the LBT needs to be performed multiple times in a process of sending the preamble, and every time the performing of the LBT has a possibility of failure, it will cause a great delay of a random access procedure. The terminal device may send the preamble and receive the RAR within a Maximum Channel Occupation Time (MCOT), and only needs to perform the LBT once. Therefore, to reduce a delay of a random access, the terminal device may send multiple preambles after LBT is successful and before the RAR receiving window ends.

However, in a scenario that the terminal device sends multiple preambles, how the terminal device determines a power for sending a Physical Uplink Shared Channel (PUSCH) is not clearly specified at present.

SUMMARY

Implementations of the present disclosure provide a random access method, a terminal device and a network device. When the terminal device sends multiple random access preambles on an unlicensed spectrum, a power for sending a physical uplink shared channel (PUSCH) can be determined.

In a first aspect, there is provided a random access method, including: receiving, by a terminal device, indication information sent by a network device, wherein the indication information is used for indicating at least one random access preamble in multiple random access preambles, and the multiple random access preambles correspond to a random access response receiving window; and determining, by the terminal device, a power for sending a physical uplink shared channel (PUSCH) according to a transmission power of a first random access preamble in the at least one random access preamble.

In a second aspect, there is provided a random access method, including: sending, by a network device, indication information to a terminal device, wherein the indication information is used for indicating at least one random access preamble in random access preambles detected by the network device, the random access preambles detected by the network device are at least part of multiple random access preambles sent by the terminal device, the at least one random access preamble includes a first random access preamble, and the multiple random access preambles correspond to a random access response receiving window.

In a third aspect, there is provided a terminal device, configured to perform a method in a first aspect or various implementation modes thereof.

Specifically, the terminal device includes functional modules for performing a method in a above first aspect or various implementation modes thereof.

In a fourth aspect, there is provided a network device, configured to perform a method in the second aspect or various implementation modes thereof.

Specifically, the network device includes functional modules for performing a method in above second aspect or any various implementation modes thereof.

In a fifth aspect, there is provided a terminal device, including a processor and a memory. The memory is configured to store a computer program, and the processor is configured to call and run the computer program stored in the memory to perform a method in the first aspect or various implementation modes thereof.

In a sixth aspect, there is provided a network device, including a processor and a memory. The memory is configured to store a computer program, and the processor is configured to call and run the computer program stored in the memory to perform a method in above second aspect or various implementation modes thereof.

In a seventh aspect, there is provided a chip, configured to implement a method in any one of the above first aspect to second aspect or various implementation modes thereof.

Specifically, the chip includes a processor configured to call and run a computer program from a memory, and enable the device disposed with the chip to perform a method in any one of the above first aspect to second aspect or various implementation modes thereof.

In an eighth aspect, there is provided a computer readable storage medium, configured to store a computer program that enables a computer to perform a method in any one of the above first aspect to second aspect or various implementation modes thereof.

In a ninth aspect, there is provided a computer program product, including computer program instructions that enable a computer to perform a method in any one of the above first aspect to second aspect or various implementation modes thereof.

In a tenth aspect, there is provided a computer program, wherein when the computer program is run on a computer, the computer is enabled to perform a method in any one of the above first aspect to second aspect or various implementation modes thereof.

Through above technical solution, in a random access procedure on an unlicensed spectrum, in a case that the terminal device sends multiple random access preambles to a network device from a time point when a channel is successfully listened to a time point when the random access response receiving window ends, the network device may send indication information indicating at least one random access preamble in the multiple random access preambles to the terminal device, so that the terminal device can determine the power of the PUSCH carrying a message 3 according to a transmission power of one indicated random access preamble in at least one random access preamble.

DETAILED DESCRIPTION

The technical solutions in implementations of the present disclosure will be described below with reference to the drawings in implementations of the present disclosure. It is apparent that the implementations described are just some implementations of the present disclosure, but not all implementations of the present disclosure. According to the implementations of the present disclosure, all other implementations achieved by a person of ordinary skill in the art without paying an inventive effort are within the protection scope of the present disclosure.

Technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, or a 5G system.

Figure 1:
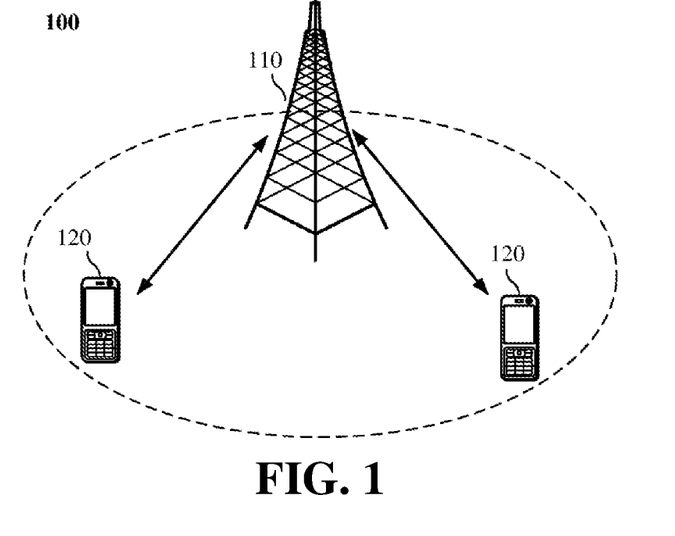
FIG. 1 is a schematic diagram of an architecture of a communication system provided by an implementation of the present disclosure.

Illustratively, a communication system 100 applied in an implementation of the present disclosure is shown in FIG. 1.

The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in a LTE system, or a radio controller in a Cloud Radio Access Network (CRAN), or the network device may be a mobile switch center, a relay station, an access point, a vehicle-mounted device, a wearable device, a hub, a switch, a bridge, a router, or a network side device in a 5G network, or a network device in a future evolved Public Land Mobile Network (PLMN), etc.

The communication system 100 also includes at least one terminal device 120 located within the coverage area of the network device 110. As used herein, the term "terminal device" includes, but not limited to, a device configured to connect via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter; and/or an apparatus, of another terminal device, configured to receive/send a communication signal; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communication System (PCS) terminal capable of combining with a cellular wireless telephone and data processing, faxing, and data communication abilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved Public Land Mobile Network (PLMN), or the like.

Optionally, terminal direct connection (Device to Device, D2D) communication may be performed between the terminal devices 120.

Optionally, the 5G system or 5G network may be referred to as a New Radio (NR) system or an NR network.

FIG. 1 exemplarily shows one network device and two terminal devices. Optionally, the communication system 100 may include multiple network devices, and other quantity of terminal devices may be included within the coverage area of each network device, and this is not limited in the implementations of the present disclosure.

Optionally, the communication system 100 may further include other network entities such as a network controller, and a mobile management entity. Implementations of the present disclosure are not limited thereto.

It should be understood that, a device with a communication function in a network/system in an implementation of the present disclosure may be referred to as a communication device. The communication system 100 shown in FIG. 1 is taken as an example, the communication device may include a network device 110 and a terminal device 120 which have the communication function, and the network device 110 and the terminal device 120 may be the specific devices described above, which will not be described here again. The communication device may also include other devices in the communication system 100, such as a network controller, a mobile management entity, and other network entities, and the implementations of the present disclosure are not limited thereto.

Figure 2:
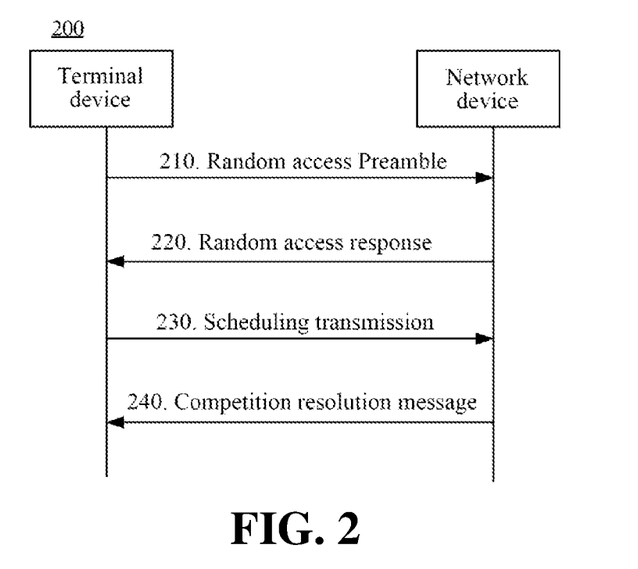
FIG. 2 is a schematic flowchart of a four-step random access approach provided by an implementation of the present disclosure.

To facilitate understanding of the solutions of implementations of the present disclosure, the following describes a four-step random access procedure based on competition with reference to FIG. 2.

It should be noted that the implementations of the present disclosure only take the random access based on competition as an example, but the present disclosure is not limited to this, and the implementations of the present disclosure may also be applied to a random access based on non-competition.

FIG. 2 is a schematic flowchart of a four-step random access approach.

In 210, a terminal device sends a preamble to a network device on a random access channel.

In 220, after detecting an access preamble sent by the terminal device, the network device sends a Random Access Response (RAR, i.e., message2, MSG2) to the terminal device to inform the terminal device of information about an uplink resource that may be used for sending a message 3 (MSG3).

The RAR may carry Time Advance (TA) information and a temporary radio network temporary identifier (RNTI).

Optionally, the MSG2 message may be generated by a Media Access Control (MAC) layer of the network device. One MSG2 message may correspond to multiple random access request responses of the terminal device simultaneously.

In 230, after receiving the MSG2, the terminal device determines whether the MSG2 is an RAR message belonging to its own. If the terminal device determines that the MSG2 is the RAR message belonging to its own, the terminal device sends the message 3 (MSG3) in an uplink resource designated by the MSG2, wherein the MSG3 carries temporary identification information specific to the terminal device.

In 240, after receiving the MSG3 message, the network device may send a message 4 (MSG4) to the terminal device. The MSG4 includes a competition resolution message and an uplink transmission resource allocated by the network device for the terminal device.

After receiving the MSG4, the terminal device may detect whether the specific temporary identification information sent in the MSG3 is included in the contention resolution message sent by the network device. If it is included, it is indicated that a random access procedure of the terminal device is successful. Otherwise, it is indicated that the random access procedure fails, and the terminal device needs to initiate a random access procedure from the first step again.

Optionally, the MSG4 may be generated by a Radio Resource Control (RRC) layer of the network device.

An NR system supports a transmission on an unlicensed spectrum, wherein the unlicensed spectrum is a spectrum divided by countries and regions to be used for communications between radio devices. The spectrum may be regarded as a shared spectrum, that is, communication devices in different communication systems may use the spectrum as long as they meet regulatory requirements set by countries or regions on the spectrum, and an exclusive spectrum license may not be applied from a government. To make each communication system using the unlicensed spectrum for a wireless communication coexist amicably on the spectrum, the communication device may follow an LBT (Listen Before Talk) principle when communicating on the unlicensed spectrum. To ensure fairness, in one transmission, a duration of a signal transmission performed by the communication device using the unlicensed spectrum channel does not exceed a Maximum Channel Occupation Time (MCOT).

Figure 3:
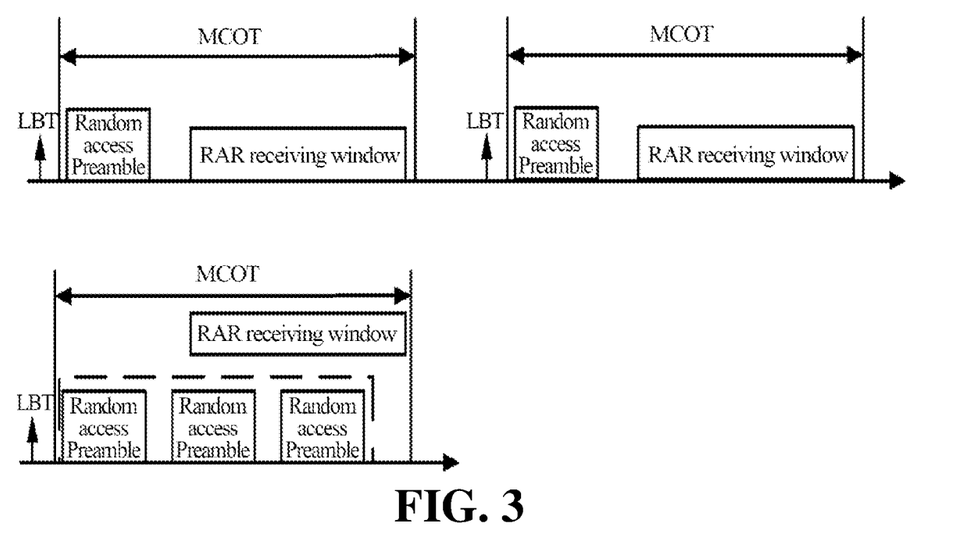
FIG. 3 is a schematic diagram of sending a random access preamble by a terminal device provided by an implementation of the present disclosure.

Therefore, MSG1-MSG4 sent in a random access procedure may only be sent after obtaining an idle channel. The terminal device may receive an RAR in an RAR receiving window after sending the preamble. If the terminal device does not receive the RAR, the terminal device sends the preamble again. On the unlicensed spectrum, every time the terminal device sends a preamble, it needs to perform an LBT, as shown in an upper figure of FIG. 3. If the terminal device fails in the LBT when sending the MSG1, the terminal device cannot continue the LBT, and cannot send the preamble again until the RAR window ends. Or, when the terminal device performs the LBT successfully and sends the preamble successfully, but the RAR is not received in the RAR receiving window, the MCOT may be exceeded when the terminal device sends a preamble next time, and the LBT needs to be performed again. Since the terminal device needs to perform the LBT multiple times in a process of sending the preamble and every time the performing of the LBT has a possibility of failure, it will cause a great delay of a random access procedure.

Therefore, to reduce a delay of the random access, the terminal device may send multiple preambles after the LBT is successful and before the RAR receiving window ends. That is, the terminal device may send multiple preambles and receive the RAR in one MCOT, as shown in a lower figure of FIG. 3.

However, in a scenario that the terminal device sends multiple preambles, how the terminal device determines a power for sending a Physical Uplink Shared Channel (PUSCH) is not clearly specified at present. In view of this, an implementation of the present disclosure proposes a random access method, which can determine the power for sending the PUSCH when the terminal device sends multiple preambles.

Figure 4:
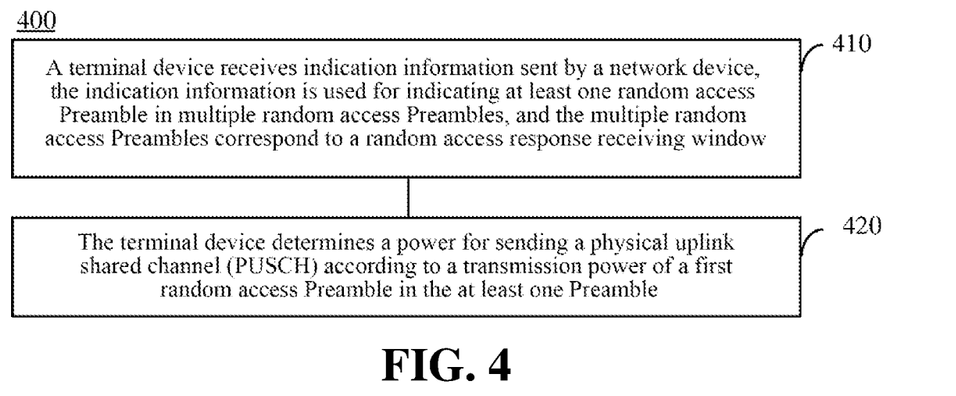
FIG. 4 is a schematic flowchart of a random access method provided by an implementation of the present disclosure.

FIG. 4 is a schematic flowchart of a random access method 400 according to an implementation of the present disclosure, wherein the method may be performed by a terminal device. The method 400 includes at least part of the following contents.

In 410, a terminal device receives indication information sent by a network device.

The indication information is used for indicating at least one preamble in multiple preambles, and the multiple preambles correspond to an RAR receiving window.

In 420, the terminal device determines a power for sending a PUSCH according to a transmission power of a first random access preamble in the at least one preamble.

Figure 5:
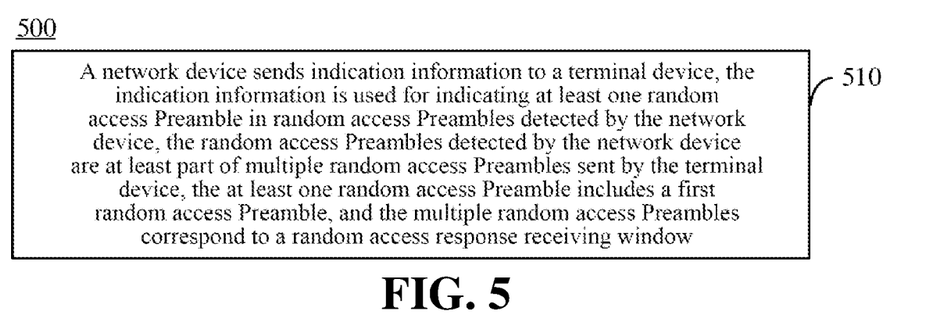
FIG. 5 is a schematic flowchart of another random access method provided by an implementation of the present disclosure.

FIG. 5 is a schematic flowchart of a random access method 500 according to an implementation of the present disclosure, wherein the method may be performed by a network device. The method 500 includes at least part of the following contents.

In 510, a network device sends indication information to a terminal device.

The indication information is used for indicating at least one preamble in preambles detected by the network device. The preambles detected by the network device are at least part of multiple preambles sent by the terminal device, the at least one preamble includes a first preamble, and the multiple preambles correspond to an RAR receiving window.

The random access method of the implementations of the present disclosure will be further described below with reference to FIG. 4 and FIG. 5. It should be understood that what is described below may be applied to the method 400 or the method 500.

It should be understood that the implementations of the present disclosure may be used not only to determine the power of the PUSCH, but also to determine a power of an uplink symbol carrying uplink information other than the PUSCH. Illustratively, the uplink symbol carrying uplink information may be a Physical Uplink Control Channel (PUCCH), or another uplink channel or uplink reference signal that may be used for transmitting uplink information.

In an implementation of the present disclosure, events that may trigger the terminal device to perform a random access may include the following.

The terminal device needs to perform an initial access.

Or, the terminal device is in an RRC connection state and needs to be switched from a serving cell to a target cell.

Or, the terminal device is in an RRC connection state, but an uplink synchronization is not achieved, and then the terminal device sends uplink data or receives downlink data.

Or, the terminal device is switched from an RRC inactive state to an RRC connection state.

Or, the terminal device is in an RRC connection state, and in this case a synchronization procedure needs to be performed, but the terminal device does not have TA.

Or, the terminal device requests Other System Information (OSI).

Or, the terminal device needs to perform a recovery for a Beam failure.

When the terminal device sends a random access preamble on an unlicensed spectrum, it may perform a channel listening first. When a result of the channel listening is that the channel is idle, the terminal device may send multiple preambles to the network device before an RAR receiving window ends, as shown in the lower figure in FIG. 3.

Optionally, transmission powers of at least two Preambles in the multiple preambles may be different.

Optionally, transmission powers of multiple preambles sent by the terminal device to the network device may be gradually increased, so that a probability of detecting the Preamble by the network device may be improved.

Or, the transmission powers of the multiple preambles sent by the terminal device to the network device may be gradually reduced or randomly changed, which is not specifically limited by the implementations of the present disclosure.

Before the terminal device sends multiple preambles to the network device, the method of the implementations of the present disclosure may further include: the terminal device receives configuration information sent by the network device, wherein the configuration information includes time-frequency resources for the terminal device to send multiple preambles. After receiving the configuration information, the terminal device may send multiple preambles to the network device by using the obtained time-frequency resources.

For example, if the network device is configured with a group of 3 time-frequency resources for preambles, the terminal device may use the 3 time-frequency resources to send 3 preambles to the network device in one MCOT after an LBT is successful.

Next, the network device may detect a preamble in multiple preambles. After that, the network device may respond to at least part of the detected preambles.

As an example, the network device may only detect one preamble, and then the preamble is the first Preamble.

As another example, if the network device detects at least two Preambles and the at least two Preambles belong to a group, that is, the detected Preambles are sent by the same terminal device, the network device may only respond to one Preamble of the at least two Preambles. The Preamble to which the network device responds is the first Preamble. Then, the network device may send an RAR to the terminal device, wherein the RAR corresponds to the first Preamble. Accordingly, the terminal device may receive an RAR sent by the network device.

When the network device responds to only one Preamble in the detected Preambles, the network device may respond to a Preamble firstly received, or the network device may respond to a Preamble with a lowest power, or may randomly respond to one Preamble in the detected Preambles, which is not limited by the implementations of the present disclosure.

As another example, the network device may respond to multiple preambles in the detected Preambles, and the multiple preambles may form a Preamble set. Then, the network device may send multiple RARs to the terminal device based on each Preamble in the Preamble set. That is, the network device may respond to at least two Preambles in the detected Preambles. Accordingly, the terminal device may receive at least two RARs sent by the network device.

In this case, a quantity of Preambles to which the network device responds may be less than or equal to a quantity of Preambles sent by the terminal device. For example, the terminal device sends 3 Preambles to the network device, and the network device may respond to all the received 3 Preambles, or may respond to 2 Preambles.

It should be noted that when the network device responds to at least two Preambles, the implementations of the present disclosure do not specifically limit which Preambles the network device responds to in the Preambles sent by the terminal device. For example, the terminal device sends 5 Preambles to the network device, which are Preamble 1, Preamble 2, Preamble 3, Preamble 4 and Preamble 5 in turn, and a size relationship of transmission powers of the 5 Preambles is Preamble 2>Preamble 5>Preamble 4>Preamble 3>Preamble 1, and the network device detects the five Preambles. If the network device responds to 3 Preambles, the network device may respond to first 3 Preambles, namely Preamble 1, Preamble 2 and Preamble 3. Or, the network device may respond to 3 Preambles with lower powers, namely Preamble 4, Preamble 3 and Preamble 1, or may respond to 3 Preambles randomly.

It should be understood that specific examples herein are only intended to help those skilled in the art to better understand the implementations of the present disclosure, and are not intended to limit the scope of the implementations of the present disclosure.

A Physical Downlink Control Channel (PDCCH) for the network device to send at least one RAR to the terminal device may be scrambled by a random access-radio network temporary identifier (RA-RNTI).

The network device may determine the RA-RNTI according to a time-frequency resource position of a preamble.

Optionally, if the network device detects at least two Preambles, RA-RNTIs corresponding to at least two Preambles in Preambles detected by the network device may be different. For example, the network device detects 3 Preambles, i.e., Preamble 1, Preamble 2 and Preamble 3 respectively. Preamble 1 and Preamble 2 may correspond to RA-RNTI 1, and Preamble 3 may correspond to RA-RNTI 2. For another example, Preamble 1 may correspond to RA-RNTI 1, Preamble 2 may correspond to RA-RNTI 2, and Preamble 3 may correspond to RA-RNTI 3.

In this case, the network device may determine each RA-RNTI according to a time-frequency resource position of each Preamble.

Optionally, if the network device detects at least two Preambles, RA-RNTIs corresponding to the Preambles detected by the network device may be the same. For example, 3 Preambles detected by the network device all correspond to RA-RNTI 1.

In this case, the network device may select one Preamble from the detected multiple preambles, and determine a corresponding RA-RNTI according to a time-frequency resource position of the selected Preamble. It should be understood that a specific implementation of the network device selecting one Preamble in the detected multiple preambles may refer to an implementation of the network device responding to only one Preamble in the detected multiple preambles, which will not be described here for the sake of brevity.

In an implementation, if RA-RNTIs corresponding to the multiple preambles detected by the network device are different from each other, indication information may be carried in an RA-RNTI.

Optionally, the indication information may indicate an RA-RNTI. After receiving the indication information, the terminal device may determine a Preamble to which the network device responds according to the RN-RNTI.

Illustratively, the terminal device sends 3 Preambles to the network device, and the network device detects the 3 Preambles. Preamble 1 corresponds to RA-RNTI 1, Preamble 2 corresponds to RA-RNTI 2, and Preamble 3 corresponds to RA-RNTI 3. If the network device responds to Preamble 2, the indication information sent by the network device may indicate RA-RNTI 3. After receiving the indication information, the terminal device may determine according to RA-RNTI 3 that the Preamble the network device responds to is Preamble 3.

In an implementation, if RA-RNTIs corresponding to at least two Preambles of multiple preambles detected by the network device are the same, the indication information may be carried in an RAR corresponding to a Preamble.

That is to say, the RAR sent by the network device received by the terminal device may carry the indication information, which is used for indicating the Preamble to which the network device responds.

As an example, multiple preambles sent by the terminal device may be numbered, and the indication information may indicate a number corresponding to a Preamble. For example, 3 Preambles sent by the terminal device are Preamble 1, Preamble 2 and Preamble 3 respectively. A number of Preamble 1 is 1, a number of Preamble 2 is 2 and a number of Preamble 3 is 3. If the network device responds to Preamble 3, the indication information may indicate 3.

Optionally, numbers corresponding to Preambles may be determined by the network device, and then the network device may send a number corresponding to each Preamble to the terminal device. Or, numbers corresponding to the Preambles may be determined by the terminal device, and a number corresponding to each Preamble may be carried in each of multiple preambles sent by the terminal device to the network device.

As yet another example, the indication information may indicate a sequence number of a Preamble detected by the network device. For example, the network device detects Preamble 1, Preamble 2 and Preamble 3 in sequence. If the network device responds to Preamble 1 and Preamble 2, the indication information may indicate 1 and 2, that is, it is indicated that the network device responds to Preambles firstly and secondly received.

As yet another example, the indication information may indicate a transmission power of the Preamble. For example, the network device detects Preamble 1, Preamble 2 and Preamble 3 in sequence, wherein a transmission power of Preamble 1 is P1, a transmission power of Preamble 2 is P2 and a transmission power of Preamble 3 is P3. If the network device responds to Preamble 3, the indication information may indicate P3.

It should be noted that if a transmission power of a Preamble to which the network device responds is as same as that of other Preambles, the indication information may indicate both the transmission power of the Preamble and the sequence number of the received Preamble.

It should be understood that various implementation modes of the implementations of the present disclosure may be implemented separately or in combination, which is not limited by the implementations of the present disclosure. For example, if RA-RNTIs corresponding to multiple preambles detected by the network device are different from each other, the indication information may indicate an RA-RNTI corresponding to a Preamble, and the number corresponding to the Preamble, or the sequence number of the Preamble detected by the network device, or the transmission power of the Preamble. For another example, if RA-RNTIs corresponding to multiple preambles detected by the network device are different from each other, the indication information may only indicate a number corresponding to a Preamble, or the sequence number of the Preamble detected by the network device, or the transmission power of the Preamble, or the like.

After the terminal device receives the indication information and determines a Preamble to which the network device responds, if the network device only responds to one Preamble, the Preamble to which the network device responds is the first Preamble.

If the network device responds to at least two Preambles, that is, the indication information received by the terminal device is used for indicating a Preamble set. Optionally, the method of the implementations of the present disclosure may further include: the terminal device determines the first Preamble in the Preamble set.

Illustratively, the terminal device may select the first Preamble based on the transmission powers of the Preambles in the Preamble set. For example, the terminal device may select a Preamble with a lowest power in the Preamble set as the first Preamble.

It should be noted that if there are multiple preambles with the lowest power, the terminal device may select a Preamble as the first Preamble in the Preambles with the lowest power. For example, the terminal device may randomly select a Preamble, or the terminal device may select a Preamble sent firstly in the Preambles with the lowest power.

Also illustratively, the terminal device may randomly select a Preamble as the first Preamble.

Also illustratively, the terminal device may select the first preamble according to a sequence in which multiple preambles are sent. For example, the terminal device may take a preamble last or firstly sent in the preamble set as the first preamble.

After the terminal device determines the first preamble, the power of the PUSCH may be determined according to a transmission power of the first preamble.

As a possible implementation, the terminal device may determine the power for sending the PUSCH according to the transmission power of the first preamble and a preset corresponding relationship between a transmission power of a preamble and the power of the PUSCH.

Optionally, the preset corresponding relationship between the transmission power of Preamble and the power of the PUSCH may be expressed as $P_{PUSCH}=f(P_{Preamble})$, wherein $P_{PUSCH}$ is the power of the PUSCH, and $P_{Preamble}$ is the transmission power of the Preamble.

Optionally, the preset corresponding relationship between the transmission power of the preamble and the power of the PUSCH may be configured by a higher layer or specified by a protocol.

After the terminal device determines the power of the PUSCH, the terminal device may send a MSG 3 to the network device based on the determined power of the PUSCH.

According to above technical solutions, in a random access procedure on an unlicensed spectrum, in a case that the terminal device sends multiple random access preambles to the network device from a time point when a channel is successfully listened to a time point when the random access response receiving window ends, the network device may send the indication information indicating at least one random access preamble in the multiple random access preambles to the terminal device, so that the terminal device can determine the power of the PUSCH carrying the message 3 according to the transmission power of one indicated random access preamble in at least one random access preamble.

It should be understood that in various implementations of the present disclosure, sequence numbers of the various processes do not imply an order of execution of the various processes, which should be determined by their functions and internal logics, and should not constitute any limitation on implementation processes of the implementations of the present disclosure.

The random access method according to the implementations of the present disclosure have been described in detail above, and random access devices according to implementations of the present disclosure will be described below with reference to FIGS. 6 to 8. The technical features described in the method implementations are applicable to the following device implementations.

Figure 6:
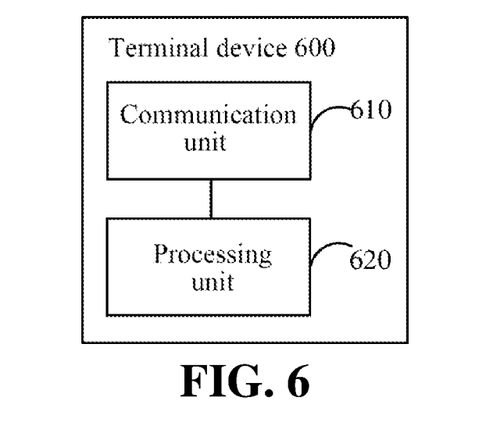
FIG. 6 is a schematic block diagram of a terminal device according to an implementation of the present disclosure.

FIG. 6 shows a schematic block diagram of a terminal device 600 of an implementation of the present disclosure. As shown in FIG. 6, the terminal device 600 includes: a communication unit 610, configured to receive indication information sent by a network device, wherein the indication information is used for indicating at least one preamble in multiple preambles, and the multiple preambles correspond to a random access response receiving window; and a processing unit 620, configured to determine a power for sending a PUSCH according to a transmission power of a first preamble in the at least one preamble.

Optionally, in an implementation of the present disclosure, transmission powers of at least two preambles in the multiple preambles are different.

Optionally, in an implementation of the present disclosure, the first preamble has a lowest transmission power in the at least one preamble.

Optionally, in an implementation of the present disclosure, the communication unit 610 is further configured to receive a random access response sent by the network device.

Optionally, in an implementation of the present disclosure, the indication information is carried in the random access response.

Optionally, in an implementation of the present disclosure, RA-RNTIs corresponding to at least two preambles in multiple preambles are same.

Optionally, in an implementation of the present disclosure, the indication information is carried in an RA-RNTI.

Optionally, in an implementation of the present disclosure, RA-RNTIs corresponding to multiple preambles are different from each other.

Optionally, in an implementation of the present disclosure, the processing unit 620 is further configured to determine the first preamble according to the RA-RNTI.

Optionally, in an implementation of the present disclosure, if the indication information is used for indicating at least two preambles in multiple preambles, the processing unit 620 is further configured to select the first preamble from preambles corresponding to the random access responses, wherein the random access responses include at least two random access responses.

Optionally, in an implementation of the present disclosure, the processing unit 620 is specifically configured to determine the power for sending the PUSCH according to a transmission power of the first preamble and a preset corresponding relationship between a transmission power of a preamble and the power of the PUSCH.

Optionally, in an implementation of the present disclosure, the communication unit 610 is further configured to receive configuration information sent by the network device, wherein the configuration information includes time-frequency resources for the network device to send the multiple preamble; and send the multiple preambles to the network device by using the time-frequency resources.

It should be understood that the terminal device 600 may correspond to the terminal device in the method 400, and may implement corresponding operations of the terminal device in the method 400, which will not be repeated here for sake of brevity.

Figure 7:
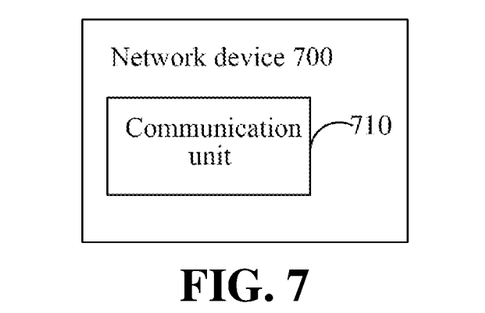
FIG. 7 is a schematic block diagram of a network device according to an implementation of the present disclosure.

FIG. 7 shows a schematic block diagram of a network device 700 of an implementation of the present disclosure. As shown in FIG. 7, the network device 700 includes: a communication unit 710, configured to send indication information to a terminal device, wherein the indication information is used for indicating at least one preamble in preambles detected by the network device 700, and the preambles detected by the network device 700 are at least part of multiple preambles sent by the terminal device, the at least one preamble includes a first preamble, and the multiple preambles correspond to a random access response receiving window.

Optionally, in an implementation of the present disclosure, transmission powers of at least two preambles in the multiple preambles are different.

Optionally, in an implementation of the present disclosure, if the preambles detected by the network device 700 include at least two preambles, the first preamble has a lowest transmission power in the preambles detected by the network device 700.

Optionally, in an implementation of the present disclosure, the network device 700 further includes a processing unit 720, configured to detect preambles in the multiple preambles.

The processing unit 720 is further configured to respond to at least part of the detected preambles.

The communication unit 710 is further configured to send a random access response to the terminal device, wherein the random access response corresponds to a preamble to which the processing unit 720 responds.

Optionally, in an implementation of the present disclosure, the indication information is carried in the random access response.

Optionally, in an implementation of the present disclosure, if preambles detected by the network device 700 include at least two preambles, RA-RNTIs corresponding to the at least two preambles in the preambles detected by the network device 700 are the same.

Optionally, in an implementation of the present disclosure, the indication information is carried in an RA-RNTI.

Optionally, in an implementation of the present disclosure, if the preambles detected by the network device 700 include at least two preambles, RNTIs corresponding to the preambles detected by the network device 700 are different from each other.

Optionally, in an implementation of the present disclosure, the communication unit 710 is further configured to send configuration information to the terminal device, wherein the configuration information includes time-frequency resources for the network device 700 to receive the multiple preambles; and receive the multiple preambles sent by the terminal device by using the time-frequency resources.

It should be understood that the network device 700 may correspond to the network device in the method 500, and may implement corresponding operations implemented by the network device in the method 500, which will not be described in detail herein for the sake of brevity.

Figure 8:
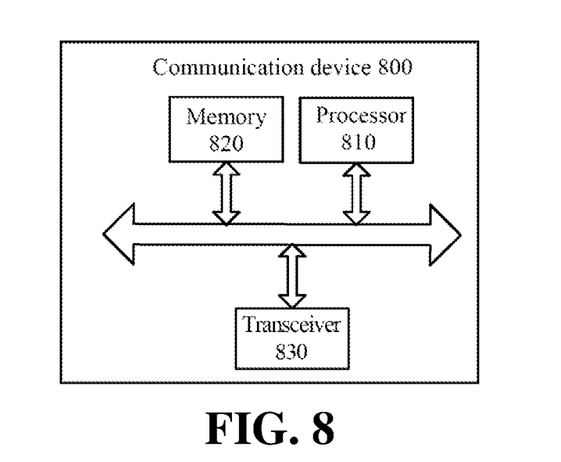
FIG. 8 is a schematic block diagram of a communication device according to an implementation of the present disclosure.

FIG. 8 is a schematic diagram of structure of a communication device 800 provided by an implementation of the present disclosure. A communication device 800 shown in FIG. 8 includes a processor 810. The processor 810 may call and run a computer program from a memory to implement the method in an implementation of the present disclosure.

Optionally, as shown in FIG. 8, the communication device 800 may include a memory 820. The processor 810 may call and run a computer program from the memory 820 to implement the method in an implementation of the present disclosure.

The memory 820 may be a separate device independent of the processor 810 or may be integrated in the processor 810.

Optionally, as shown in FIG. 8, the communication device 800 may further include a transceiver 830, and the processor 810 may control the transceiver 830 to communicate with other devices. Specifically, the transceiver 830 may send information or data to other devices or receive information or data sent by other devices.

The transceiver 830 may include a transmitter and a receiver. The transceiver 830 may further include antennas, and a quantity of antennas may be one or more.

Optionally, the communication device 800 may be the network device of the implementations of the present disclosure, and the communication device 800 may implement the corresponding processes implemented by the network device in various methods of the implementations of the present disclosure, which will not be repeated here for brevity.

Optionally, the communication device 800 may be specifically the terminal device of the implementations of the present disclosure, and the communication device 800 may implement the corresponding processes implemented by the terminal device in the various methods of the implementations of the present disclosure, which will not be repeated here for brevity.

Figure 9:
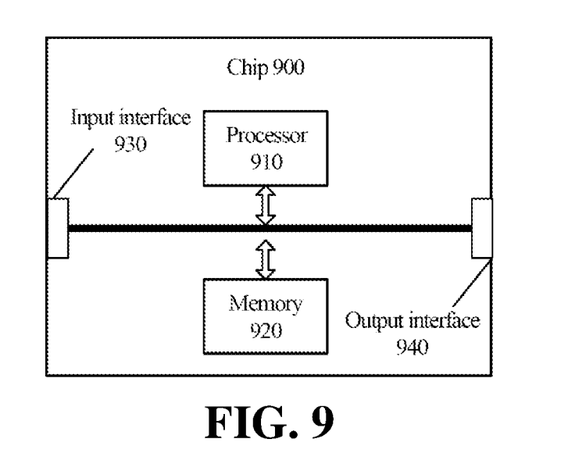
FIG. 9 is a schematic block diagram of a chip according to an implementation of the present disclosure.

FIG. 9 is a schematic structural diagram of a chip of an implementation of the present disclosure. A chip 900 shown in FIG. 9 includes a processor 910. The processor 910 may call and run a computer program from a memory to implement the method in an implementation of the present disclosure.

Optionally, as shown in FIG. 9, the chip 900 may further include a memory 920. The processor 910 may call and run a computer program from the memory 920 to implement the method in an implementation of the present disclosure.

The memory 920 may be a separate device independent of the processor 910 or may be integrated in the processor 910.

Optionally, the chip 900 may further include an input interface 930. The processor 910 may control the input interface 930 to communicate with other devices or chips. Specifically, the processor 910 may acquire information or data sent by other devices or chips.

Optionally, the chip 900 may further include an output interface 940. The processor 910 may control the output interface 940 to communicate with other devices or chips. Specifically, the processor 910 may output information or data to other devices or chips.

Optionally, the chip may be applied in the terminal device of the implementations of the present disclosure, and the chip may implement the corresponding processes implemented by the terminal device in the various methods of the implementations of the present disclosure, which will not be repeated here for brevity.

Optionally, the chip may be applied in the network device of the implementations of the present disclosure, and the chip may implement the corresponding processes implemented by the network device in various methods of the implementations of the present disclosure, which will not be repeated here for brevity.

It should be understood that the chip mentioned in an implementation of the present disclosure may be referred to as a system-level chip, a system chip, a chip system or a system-on-chip, etc.

It should be understood that, the processor in this implementation of the present disclosure may be an integrated circuit chip having a signal processing capability. In an implementation process, the acts of the foregoing method implementations may be implemented by using an integrated logic circuit of hardware in the processor or instructions in a form of software. The processor may be a general purpose processor, a digital signal processor (Digital Signal Processing, DSP), an application specific integrated circuit (Application Specific Integrated Circuit, ASIC), a field programmable gate array (Field Programmable Gate Array, FPGA) or another programmable logic device, a discrete gate or a transistor logic device, or a discrete hardware component. The processor may implement or perform methods, acts and logical block diagrams disclosed in the implementations of the present disclosure. The general purpose processor may be a microprocessor, or the processor may be any conventional processor or the like. The acts of the method disclosed with reference to this implementation of the present disclosure may be directly implemented by a hardware decoding processor, or may be implemented by a combination of hardware in the decoding processor and software modules. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware.

It can be understood that, the memory in the implementations of the present disclosure may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM). It should be noted that the memories in the systems and methods described in this specification are intended to include, but are not limited to, these and any other suitable types of memories.

It should be understood that, the foregoing memory is an example for illustration and should not be construed as limiting. For example, optionally, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, memories in the implementations of the present disclosure are intended to include, but are not limited to, these and any other suitable types of memories.

Figure 10:
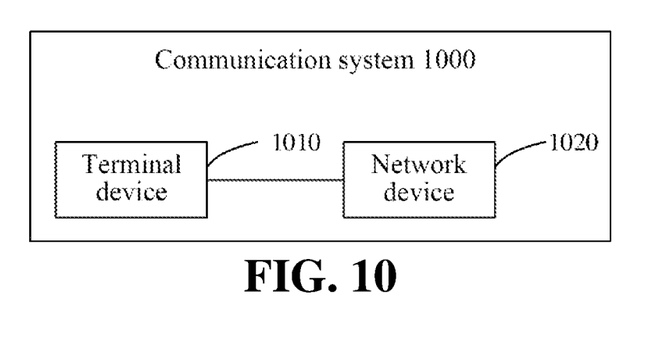
FIG. 10 is a schematic block diagram of a communication system according to an implementation of the present disclosure.

FIG. 10 is a schematic block diagram of a communication system 1000 provided by an implementation of the present disclosure. As shown in FIG. 10, the communication system 1000 may include a terminal device 1010 and a network device 1020.

Herein, the terminal device 1010 may be configured to implement the corresponding functions implemented by the terminal device in the above-mentioned methods, and the network device 1020 may be configured to implement the corresponding functions implemented by the network device in the above-mentioned methods, which will not be repeated here for brevity.

An implementation of the present disclosure further provides a computer readable storage medium configured to store a computer program.

Optionally, the computer readable storage medium may be applied in the terminal device of the implementations of the present disclosure, and the computer program enables the computer to perform the corresponding processes implemented by the terminal device in various methods of the implementations of the present disclosure.

Optionally, the computer readable storage medium may be applied in the network device of the implementations of the present disclosure, and the computer program enables the computer to perform the corresponding processes implemented by the network device in various methods of the implementations of the present disclosure, which will not be repeated here for brevity.

An implementation of the present disclosure also provides a computer program product including computer program instructions.

Optionally, the computer program product may be applied in the terminal device of the implementations of the present disclosure, and the computer program instructions enable the computer to perform the corresponding processes implemented by the terminal device in various methods according to the implementations of the present disclosure, which will not be repeated here for brevity.

Optionally, the computer program product may be applied in the network device of the implementations of the present disclosure, and the computer program instructions enable the computer to perform the corresponding processes implemented by the network device in various methods of the implementations of the present disclosure, which will not be repeated here for brevity.

An implementation of the present disclosure also provides a computer program.

Optionally, the computer program may be applied in the terminal device of the implementations of the present disclosure. When the computer program is run on the computer, the computer is enabled to perform the corresponding processes implemented by the terminal device in various methods of the implementations of the present disclosure, which will not be repeated here for brevity.

Optionally, the computer program may be applied in the network device of the implementations of the present disclosure. When the computer program is run on the computer, the computer is enabled to perform the corresponding processes implemented by the network device in various methods of the implementations of the present disclosure, which will not be repeated here for brevity.

Those of ordinary skill in the art will recognize that the exemplary elements and algorithm acts described in combination with the implementations disclosed herein may be implemented in electronic hardware, or a combination of computer software and electronic hardware. Whether these functions are implemented in hardware or software depends on the specific applications and design constraints of the technical solutions. Skilled artisans may use different methods to implement the described functions in respect to each particular application, but such implementation should not be considered to be beyond the scope of the present disclosure.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the methods described in various implementations of the present disclosure. The foregoing storage medium includes: any medium that can store program codes, such as a USB flash drive, a removable hard disk, a read-only memory (Read-Only Memory, ROM), a random access memory (Random Access Memory, RAM), a magnetic disk, or an optical disc.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What is claimed is:

1. A random access method, comprising:
   receiving, by a terminal device, indication information sent by a network device, wherein the indication information is used for indicating at least one random access preamble in a plurality of random access preambles, and the plurality of random access preambles correspond to a random access response receiving window; and
   determining, by the terminal device, a power for sending a physical uplink shared channel (PUSCH) according to a transmission power of a first random access preamble in the at least one random access preamble.

2. The method of claim 1, wherein transmission powers of at least two random access preambles in the plurality of random access preambles are different, and
   the first random access preamble has a lowest transmission power in the at least one random access preamble.

3. The method of claim 1, further comprising:
   receiving, by the terminal device, a random access response sent by the network device.

4. The method of claim 3, wherein the indication information is carried in the random access response,
   random access-radio network temporary identifiers (RA-RNTIs) corresponding to at least two random access preambles in the plurality of random access preambles are same.

5. The method of claim 3, wherein the indication information is carried in a random access-radio network temporary identifier (RA-RNTI),
   RA-RNTIs corresponding to the plurality of random access preambles are different from each other,
   and the method further comprises:
   determining, by the terminal device, the first random access preamble according to the RA-RNTI.

6. The method of claim 3, wherein upon determining that the indication information is used for indicating at least two random access preambles in the plurality of random access preambles, the method further comprises:
   selecting, by the terminal device, the first random access preamble from random access preambles corresponding to random access responses, wherein the random access responses comprise at least two random access responses.

7. A random access method, comprising:
   sending, by a network device, indication information to a terminal device, wherein the indication information is used for indicating at least one random access preamble in random access preambles detected by the network device, the random access preambles detected by the network device are at least part of a plurality of random access preambles sent by the terminal device, the at least one random access preamble comprises a first random access preamble, and the plurality of random access preambles correspond to a random access response receiving window.

8. The method of claim 7, wherein transmission powers of at least two random access preambles in the plurality of random access preambles are different, and
   upon determining that the random access preambles detected by the network device comprise at least two random access preambles, the first random access preamble has a lowest transmission power in the random access preambles detected by the network device.

9. The method of claim 7, further comprising:
   detecting, by the network device, random access preambles in the plurality of random access preambles;
   responding to, by the network device, at least part of the detected random access preambles; and
   sending, by the network device, a random access response to the terminal device, wherein the random access response corresponds to a random access preamble to which the network device responds.

10. The method of claim 9, wherein the indication information is carried in the random access response, upon determining that the random access preambles detected by the network device comprise at least two random access preambles, random access-wireless network temporary identifiers (RA-RNTIs) corresponding to the at least two access preambles of the random access preambles detected by the network device are same;

or, the indication information is carried in a random access-wireless network temporary identifier (RA-RNTI), upon determining that the random access preambles detected by the network device comprise at least two random access preambles, RNTIs corresponding to the random access preambles detected by the network device are different from each other.

11. A terminal device, comprising: a processor and a transceiver, wherein the transceiver is configured to receive indication information sent by a network device, wherein the indication information is used for indicating at least one random access preamble in a plurality of random access preambles, and the plurality of random access preambles correspond to a random access response receiving window; and the processor is configured to determine a power for sending a physical uplink shared channel (PUSCH) according to a transmission power of a first random access preamble in the at least one random access preamble.

12. The terminal device of claim 11, wherein transmission powers of at least two random access preambles in the plurality of random access preambles are different, and the first random access preamble has a lowest transmission power in the at least one random access preamble.

13. The terminal device of claim 11, wherein the transceiver is further configured to:

receive a random access response sent by the network device.

14. The terminal device of claim 13, wherein the indication information is carried in the random access response, and random access-radio network temporary identifiers (RA-RNTIs) corresponding to at least two random access preambles in the plurality of random access preambles are same.

15. The terminal device of claim 13, wherein the indication information is carried in a random access-radio network temporary identifier (RA-RNTI), RA-RNTIs corresponding to the plurality of random access preambles are different from each other, and the processor is further configured to:

determine the first random access preamble according to the RA-RNTI.

16. The terminal device of claim 11, wherein the processor is further configured to:

determine the power for sending the PUSCH according to the transmission power of the first random access preamble and a preset corresponding relationship between a transmission power of a random access preamble and a power of the PUSCH; and the transceiver is further configured to:

receive configuration information sent by the network device, wherein the configuration information comprises time-frequency resources for the terminal device to send the plurality of random access preambles; and send the plurality of random access preambles to the network device by using the time-frequency resources.

17. A network device, comprising: a processor and a transceiver, wherein the transceiver is configured to send indication information to a terminal device, wherein the indication information is used for indicating at least one random access preamble in random access preambles detected by the network device, the random access preambles detected by the network device are at least part of a plurality of random access preambles sent by the terminal device, the at least one random access preamble comprises a first random access preamble, and the plurality of random access preambles correspond to a random access response receiving window.

18. The network device of claim 17, wherein transmission powers of at least two random access preambles in the plurality of random access preambles are different, and upon determining that the random access preamble detected by the network device comprises at least two random access preambles, the first random access preamble has a lowest transmission power in the random access preambles detected by the network device.

19. The network device of claim 17, wherein the processor is configured to detect random access preambles in the plurality of random access preambles; and respond to at least part of the detected random access preambles; and the transceiver is further configured to:

send a random access response to the terminal device, wherein the random access response corresponds to a random access preamble to which the processor responds.

20. The network device of claim 17, wherein the transceiver is further configured to:

send configuration information to the terminal device, wherein the configuration information comprises time-frequency resources for the network device to receive the plurality of random access preambles; and receive the plurality of random access preambles sent by the terminal device, by using the time-frequency resources.

* * * * *